United States Patent
Kono

(10) Patent No.: US 6,739,592 B2
(45) Date of Patent: May 25, 2004

(54) BRUSH SEAL DEVICE

(75) Inventor: Toru Kono, Sakado (JP)

(73) Assignee: Eagle Engineering Aerospace Co., Ltd., Tokyo (JP)

( * ) Notice: Subject to any disclaimer, the term of this patent is extended or adjusted under 35 U.S.C. 154(b) by 0 days.

(21) Appl. No.: 10/052,375

(22) Filed: Jan. 23, 2002

(65) Prior Publication Data
US 2002/0140175 A1 Oct. 3, 2002

(30) Foreign Application Priority Data
Mar. 27, 2001 (JP) ........................... 2001-089257

(51) Int. Cl.[7] ................................. F16J 15/44
(52) U.S. Cl. .................. 277/355; 277/387; 277/388; 277/926
(58) Field of Search ............................ 277/355

(56) References Cited

U.S. PATENT DOCUMENTS

| | | | | |
|---|---|---|---|---|
| 5,042,823 A | * | 8/1991 | Mackay et al. | 277/355 |
| 5,106,104 A | * | 4/1992 | Atkinson et al. | 277/355 |
| 5,135,237 A | * | 8/1992 | Flower | 277/355 |
| 5,335,920 A | * | 8/1994 | Tseng et al. | 277/355 |
| 5,401,036 A | * | 3/1995 | Basu | 277/355 |
| 5,474,305 A | * | 12/1995 | Flower | 277/355 |
| 5,480,165 A | * | 1/1996 | Flower | 277/355 |
| 5,758,879 A | * | 6/1998 | Flower | 277/355 |
| 5,799,952 A | * | 9/1998 | Morrison et al. | 277/355 |
| 5,975,535 A | * | 11/1999 | Gail et al. | 277/355 |
| 6,139,019 A | * | 10/2000 | Dinc et al. | 277/355 |
| 6,173,962 B1 | * | 1/2001 | Morrison et al. | 277/355 |
| 2003/0006559 A1 | * | 1/2003 | Inoue | 277/355 |

* cited by examiner

Primary Examiner—Lynne H. Browne
Assistant Examiner—Christopher Boswell
(74) Attorney, Agent, or Firm—Arent Fox Kintner Plotkin & Kahn

(57) ABSTRACT

A brush seal device is mounted to one of two parts that move relative to each other with a gap therebetween, and seals the gap between the parts. Even when a brush seal abuts on the other part, it is deformed accordingly. As a result, wear of the brush seal is prevented. The brush seal device includes: a brush seal formed from bristles arranged into a wall shape, and including an attachment portion formed by connecting the bristles together at one end, and a free end face facing an opposing surface of the other part; a back plate connected to the attachment portion of the brush seal, and including a support surface for supporting a side surface of the brush seal; and a retaining plate for retaining the attachment portion of the brush seal between the retaining plate and the back plate. The support surface of the back plate and an opposing surface of the brush seal are disposed at a distance from each other. The bristle of the brush seal has a diameter of 0.15 mm to 0.008 mm.

3 Claims, 15 Drawing Sheets

BRUSH SEAL DEVICE

FIELD OF THE INVENTION

The present invention relates to a brush seal device for sealing a gap between two parts that move relative to each other about a rotating shaft of an airplane, gas turbine or the like. More particularly, the present invention relates to the field of a brush seal device for sealing a gap between two parts by causing a brush seal to elastically deform according to movement of one part even when the dimension of the gap is changed and thus preventing contact wear.

BACKGROUND OF THE INVENTION

There is a brush seal device 100 of FIG. 13 as an example of the related art of the present invention.

FIG. 13 is a cross-sectional view of the brush seal device 100. The brush seal device 100 is mounted between a rotating shaft 120 and a hole formed in a casing 110, and the rotating shaft 120 extends through the hole. This casing 110 is a part of a steam turbine. The brush seal device 100 separates the gap between the casing 110 and the rotating shaft 120 so as to seal a sealed fluid (steam fluid) flowing in the gap.

The brush seal device 100 has a ring shape, and is mounted in an annular groove 112 in the casing 110. The brush seal device 100 mainly includes a brush seal 109, a back plate 102 and a retaining plate 103. The brush seal 109 is formed from bristles 101 radially arranged into a wall shape along the circumference. The bristles 101 are connected together at one end to form an attachment portion 104. A free end face 105 of the brush seal 109 faces the rotating shaft 120. The bristle 101 of the brush seal 109 commonly has a diameter of 0.25 mm or more.

The annular back plate 102 has its side surface 108 in contact with one side surface of the brush seal 109. The annular back plate 102 supports the bristles 101 against the pressure of the sealed fluid.

The retention plate 103 has a ring shape, and is mounted on the other side surface of the brush seal 109. The attachment portion 104 of the brush seal 109 is thus held between the retaining plate 103 and the back plate 102. The retention plate 103 has a small width in the radial direction of the brush seal 109 so that the brush seal 109 is exposed to the sealed fluid.

The back plate 102, the attachment portion 104 of the brush seal 109 and the retaining plate 103 are welded together to form a connected portion 106.

FIG. 14 is a front view of the brush seal 109, illustrating the present invention or the related art. The brush seal device 100 of FIG. 14 is in a normally fitted state in which the brush seal 109 and the rotating shaft 120 do not move relative to each other. In this normal state, the rotating shaft 120 shown by the virtual line in FIG. 13 is located in contact with or near the free end face of the brush seal 109.

Although not shown in the figure, a brush seal device according to another example of the related art has a small gap between the side surface 108 of the back plate 102 and the side surface of the brush seal 101. However, the bristle 101 having a diameter of 0.25 mm or more hinders the function of the gap. In other words, the bristles 101 will not be deflected according to movement of the rotating shaft 120. This accelerates wear of the free end face 105 of the bristles 101. Moreover, such a large diameter of the bristle 101 makes it impossible to form a thicker wall of the bristles in view of the friction with the rotating shaft. This results in degraded sealing capability.

In the above brush seal device 100, when the rotating shaft 120 contacts the brush seal 109 due to vibration or the like as shown in FIG. 13, the brush seal 109 is further tilted in the rotation direction under the pressure from the rotating shaft 120 as shown in FIG. 15.

If the sealed fluid has a high pressure P1 in this state, the brush seal 109 is pressed against the side surface 108 of the back plate 102 due to a large difference between the high and low pressures P1 and P2 (P1–P2), as shown in FIG. 16.

In the state of FIG. 16, the bristles 101 of the brush seal 109 are less likely to be deflected because they are pressed against the side surface 108 of the back plate 102. In other words, the bristles 101 are less likely to be deflected according to movement of the rotating shaft 120. Moreover, the sealed fluid enters between the bristles 101, whereby one bristle 101 is raised relative to the other. As a result, the tilted bristles 101 try to reduce the tilting angle of the raised bristles 101. Since the raised bristles 101 have a long radial length, the pressure from the rotation shaft 120 is increased, causing wear of the brush seal 2.

When the vibration of the rotating shaft 120 is reduced as shown in FIG. 17, the gap C between the worn free end face 105 of the bristles 101 and the rotating shaft 120 is increased as shown in FIG. 18. As a result, the sealed fluid leaks through the gap C. Moreover, when the pressure P1 of the sealed fluid is reduced (i.e., when the difference between the pressure P1 and the pressure P2 in the downstream region (P1–P2) is reduced), the rotation force of the rotating shaft 120 becomes dominant. Accordingly, the gap C between the rotating shaft 120 and the free end face 105 of the bristles 101 may be increased due to the rotation force. In this case as well, the sealed fluid leaks through the gap C.

The preset invention is made in view of the above problems. It is an object of the present invention to improve flexibility of a brush seal against the pressure of a rotating shaft, and reduce the wear due to friction between the brush seal and the rotating shaft by the flexibility of the brush seal.

It is another object of the present invention to improve sealing capability by improving the ability of the brush seal to deflect according to movement of the rotating shaft.

It is still another object of the present invention to improve sealing capability by densely arranging bristles of a smaller diameter into a wall shape.

It is yet another object of the present invention to improve sealing capability and prevent friction-induced damages by preventing abnormal movement of the aligned bristles.

It is a further object of the present invention to enable the brush seal to be deformed according to the pressure value of a sealed fluid by controlling in balance the front pressure of the sealed fluid acting on the bristles and the back pressure of the sealed fluid in a recess passing through the brush seal.

SUMMARY OF THE INVENTION

The present invention is made to solve the above problems. Means for solving the problems are structured as follows:

A brush seal device according to the present invention is mounted to one of two parts that move relative to each other with a gap therebetween, and seals the gap between the parts by a brush seal. The bush seal device includes: a brush seal formed from bristles arranged into a wall shape, and including an attachment portion formed by connecting the bristles together at one end, and a free end face facing an opposing surface of the other part; a back plate connected to the attachment portion of the brush seal, and including a support surface for supporting a side surface of the brush seal; and a retaining plate for retaining the attachment portion of the brush seal between the retaining plate and the back plate. The support surface of the back plate and an opposing surface of the brush seal are disposed at a distance from each other. The bristle of the brush seal has a diameter of 0.15 mm to 0.008 mm.

In the brush seal device of the present invention, the bristles are disposed at a distance from the support surface of the back plate, and the bristle has a diameter of 0.15 mm to 0.008 mm. Therefore, even when the other part contacts the free end face of the bristles, the bristles can be elastically deformed toward the support surface. For example, even if the bristles abut on the rotor, they are moved while reducing the contact pressure. Accordingly, wear of the bristles is prevented.

Moreover, since the bristles are thin, they can be densely arranged into a wall, allowing improvement in sealing capability.

DETAILED DESCRIPTION OF THE INVENTION

Hereinafter, preferred embodiments of the present invention will be described in detail in conjunction with the accompanying drawings. Note that the following figures disclose the technology merely as design drawings.

Figure 1:
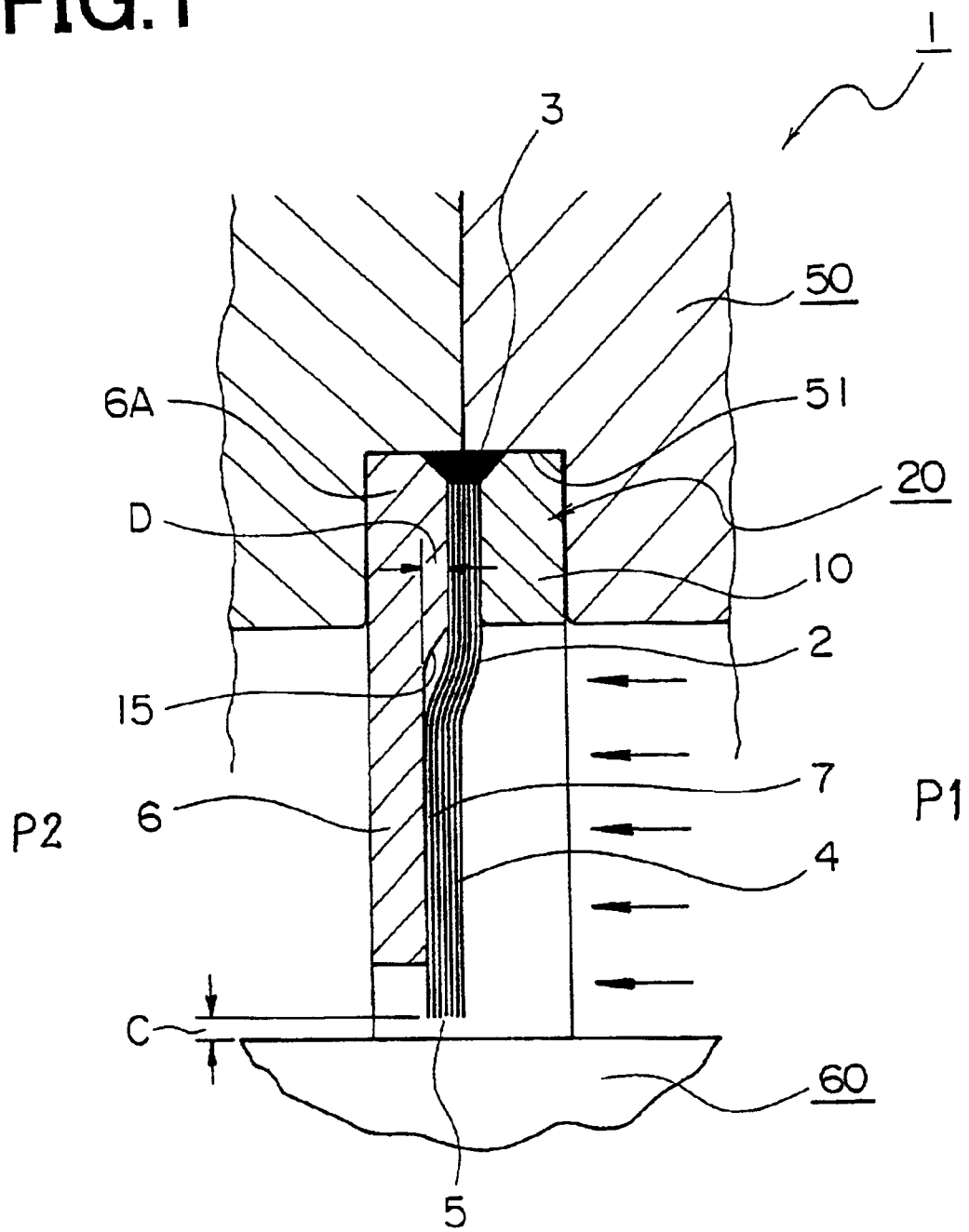
FIG. 1 is a cross-sectional view of a brush seal device mounted between parts according to a first embodiment of the present invention.

FIG. 1 is a cross-sectional view of a brush seal device 1. The brush seal device divides the gap between a casing 50 and a rotor 60 of a gas turbine into a high-pressure (P1) side and a low-pressure (P2) side.

Referring to FIG. 1, the brush seal device 1 has a fixed portion 20 in its outer periphery, and a free end face 5 at its inner periphery. The fixed portion 20 is mounted in a groove 51 formed at the inner peripheral surface of one part (the casing 50). The free end face 5 faces the outer peripheral surface of the other part (the rotor 60). More specifically, the free end face 5 is in contact with, or in close proximity to, the outer peripheral surface of the rotor 60. The brush seal device 1 serves to seal a sealed fluid on the high-pressure (P1) side.

The brush seal device 1 mainly includes a brush seal 2, a back plate 6 and a retaining plate 10.

The brush seal 2 is formed from bristles 4 disposed like a wall with a prescribed thickness. More specifically, the bristles 4 are tilted in the rotation direction of the rotor 60, and arranged into a wall shape in the circumferential direction. The bristles 4 are welded together at the outer periphery to form an attachment portion 3. The bristle 4 has a diameter of 0.2 mm to 0.005 mm, and preferably, 0.15 mm to 0.008 mm, and has a length of 5 mm to 50 mm. The wall thickness of the bristles 4 is preferably in the range of 0.5 mm to 5 mm.

The bristles 4 are formed from a material such as steel, nickel-based alloy or ceramics.

The back plate 6 has a fixed portion 6A for holding the attachment portion 3 of the brush seal 2, and a support surface 7 for supporting the brush seal 2 so as to prevent the brush seal 2 from being excessively deflected by the pressure of the sealed fluid. The brush seal 2 and the support surface 7 are disposed with a gap D therebetween. A larger gap D is better. However, a too large gap D would cause fatigue failure of the attachment portion 3 of the bristles 4 due to deflection. In order to prevent such fatigue failure, the back plate 6 includes a deformation preventing portion 15. The deformation preventing portion 15 may either have a tilted or convex surface.

Due to the gap D between the support surface 7 of the back plate 6 and the brush seal 2, the brush seal 2, when subjected to the pressure of the sealed fluid, contacts the support surface 7 with deflection by the amount D. Accordingly, the radial length of the bristles 4 is reduced according to the deflection amount. As a result, the brush seal 2 is separated from the rotor 60 by the gap C.

In other words, even if the rotor 60 vibrates, the contact pressure is reduced in the range of the gap C. Even if the rotor 60 further swings enough to contact the brush seal 2, the deflected bristles 4 decrease the contact force. As a result, wear of the bristles 4 is prevented.

The attachment portion 3 of the brush seal 2 is integrally connected with the back plate 2 and the retaining plate 10 by electron beam welding. The welded portion of the three elements serves as the fixed portion 20. The retaining plate 10, which has a ring shape, has a smaller radial width than that of the back plate 6.

Note that, in FIG. 1, the length of the retaining plate 10 corresponds to that of the fixed portion 20. As shown in FIG.

Figure 9:
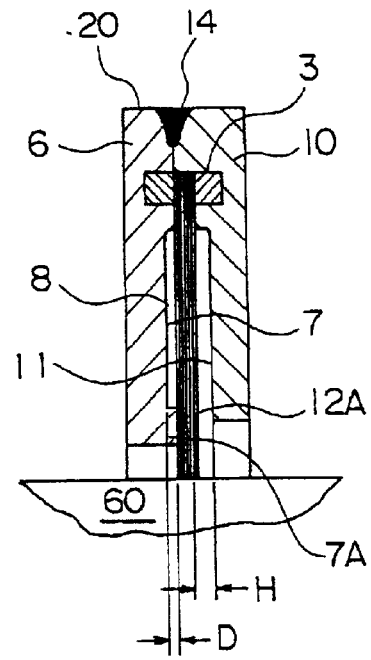
FIG. 9 is a cross-sectional view of a brush seal device according to an eighth embodiment of the present invention.

9, however, the retaining plate 10 may have a radial length close to that of the back plate 6. In the case of FIG. 9, a space H is provided between the brush seal 2 and a side surface 11 of the retaining portion 10 so that the sealed fluid can flow therein.

The material of the back plate 6 and the retaining plate 10 is preferably selected according to the linear expansion coefficient of the material of the casing 50. The back plate 6 and the retaining plate 10 are formed from a material such as nickel-based alloy, iron, steel or non-iron metal. Various materials are selected according to the type and temperature of the sealed fluid or the conditions of other fields of applications.

Figure 2:
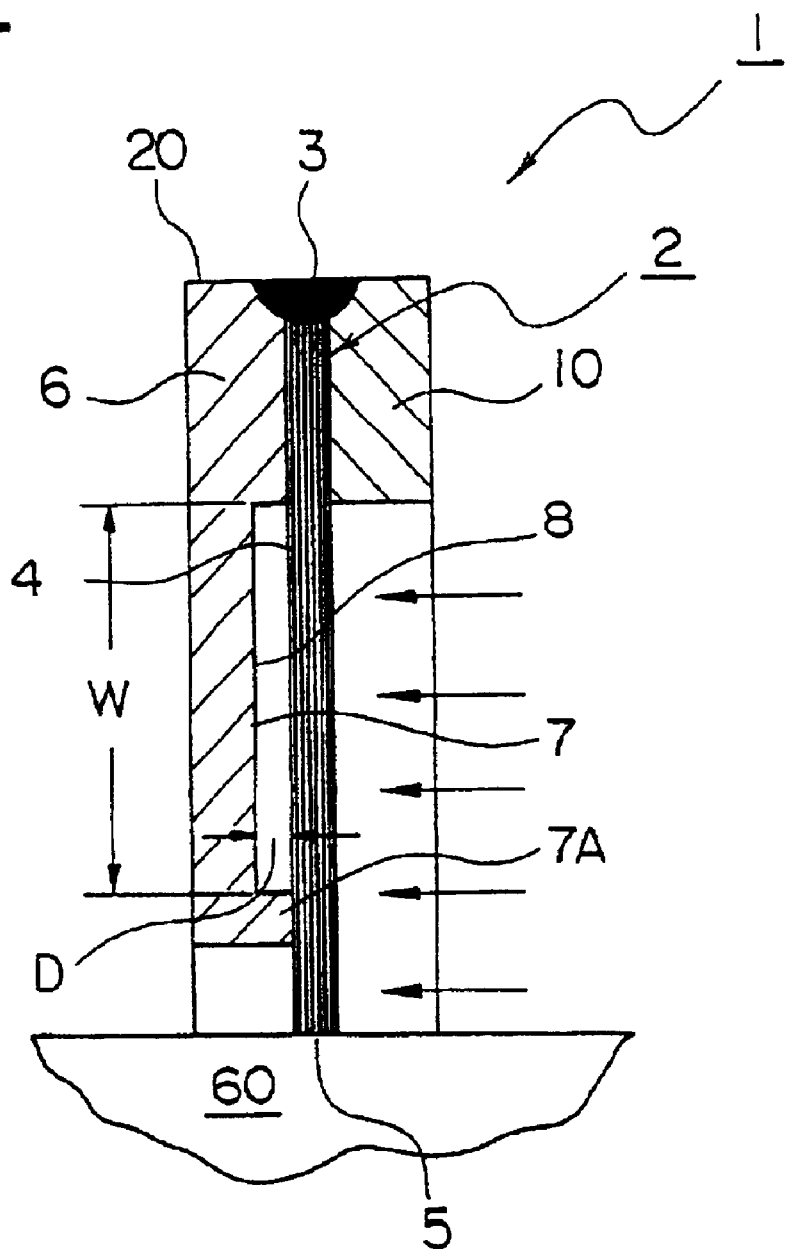
FIG. 2 is a cross-sectional view of a brush seal device according to a second embodiment of the present invention.

FIG. 2 is a cross-sectional view of a brush seal device according to a second embodiment of the present invention.

The brush seal device 1 of FIG. 2 has approximately the same structure as that of FIG. 1 except for the support surface 7. The back plate 6 of FIG. 2 has a recess 8 corresponding to the support surface 7. The essential difference between the brush seal devices of FIGS. 1 and 2 is that the back plate 6 of FIG. 2 has an annular recess 8 and an annular projection 7A. The annular projection 7A is formed at the inner peripheral end of the support surface 7. The depth D of the recess 8 corresponds to the gap D between the support surface 2 and the opposing surface of the brush seal 2.

Figure 4:
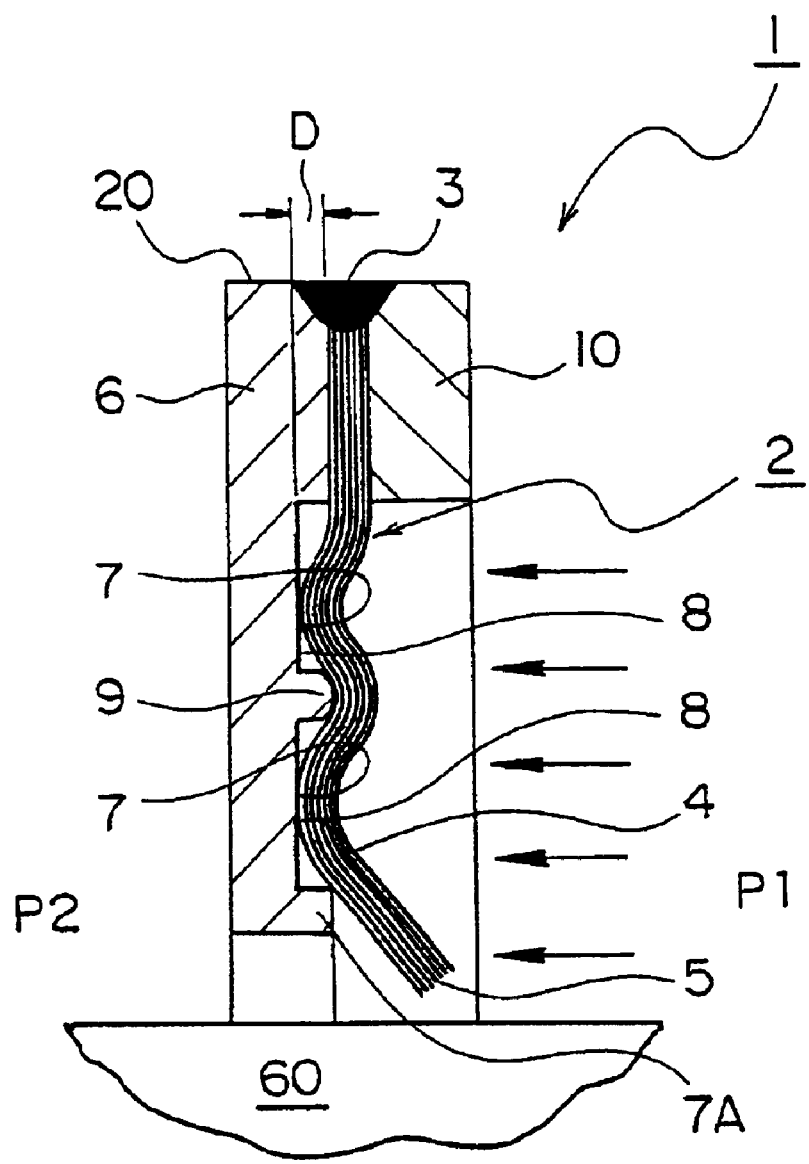
FIG. 4 is a cross-sectional view showing the state where the brush seal device of FIG. 2 is subjected to the pressure of a sealed fluid.

In response to the pressure of the sealed fluid, the brush seal 2 is deflected into a curved shape and contacts the support surface 7 (i.e., the bottom of the recess 8) as shown in FIG. 4. Therefore, the radial length of the brush seal 2 is reduced more than that of FIG. 1 by the deflection.

Moreover, the projection 7A may have a chamfered corner or a tilted surface so that the bristles 4 are deflected gently.

In the present embodiment, when the rotor 60 vibrates or swings largely, the projection 7A serves to reduce the radial length of the bristles 4 in order to reduce the contact pressure according to the vibration or swing. Actually, the free end face 5 of the brush seal 2 is tilted at a somewhat smaller angle than that shown in FIG. 4 due to the pressure of the sealed fluid, so that the free end face 5 faces the outer peripheral surface of the rotor 60.

Figure 3:
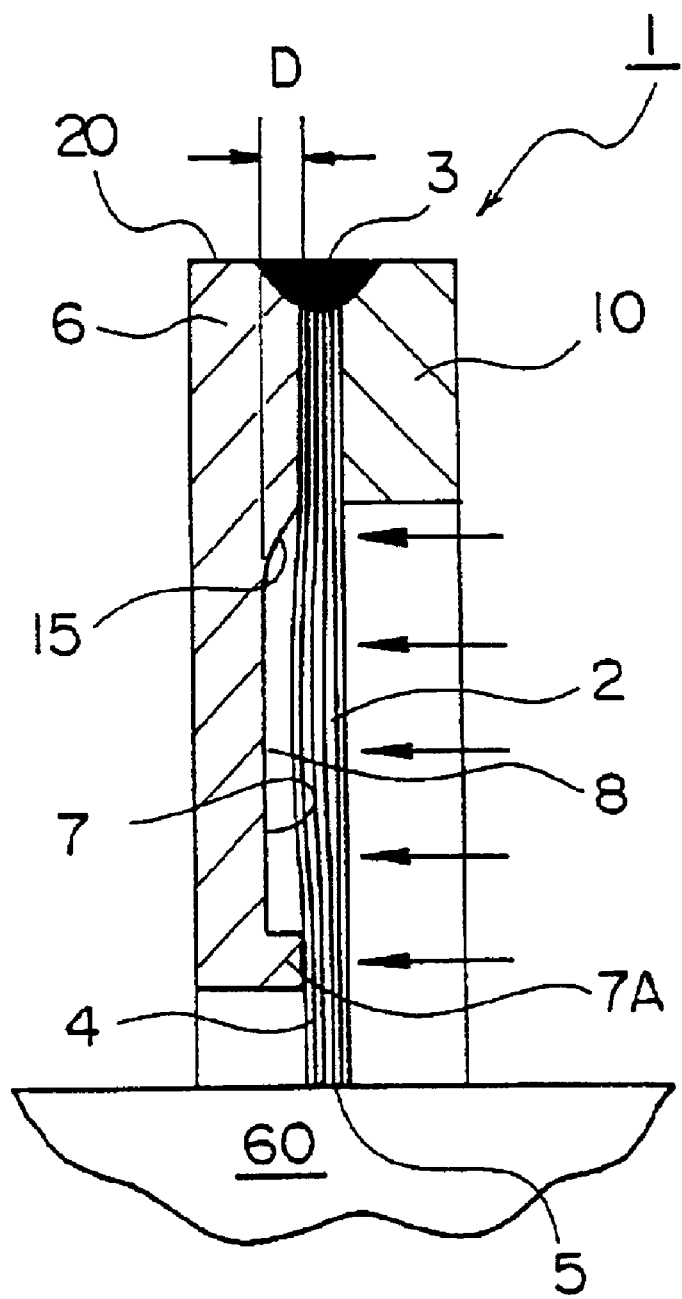
FIG. 3 is a cross-sectional view of a brush seal device according to a third embodiment of the present invention.

FIG. 3 is a cross-sectional view of a brush seal device 1 according to a third embodiment of the present invention. The brush seal device 1 of FIG. 3 is different from that of FIG. 2 in that the back plate 6 has a deformation preventing portion 15 at the end of the support surface 7 (the bottom of the recess 8) located closer to the attachment portion 3 of the brush seal 2. Although the deformation preventing portion 15 has a tilted surface in FIG. 3, it may have a convex surface. As described in connection with FIG. 1, the deformation preventing portion 15 prevents bending fatigue of the brush seal 2 around the attachment portion 3. When the pressure of the sealed fluid is applied, the intermediate portion of the brush seal 2 is deformed into a curved shape and supported by the support surface 7 as shown in FIG. 4. The radial length of the bristles 4 is reduced according to the deflection.

Figure 5:
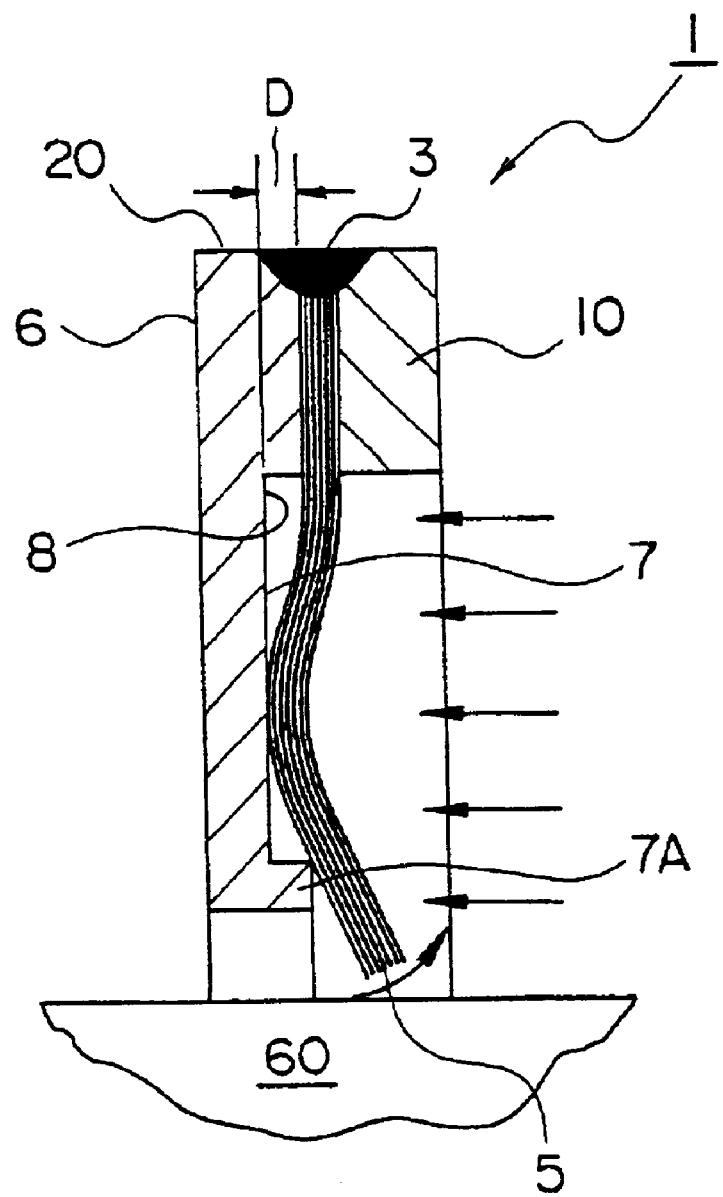
FIG. 5 is a cross-sectional view of a brush seal device according to a fourth embodiment of the present invention.

FIG. 5 is a cross-sectional view of a brush seal device 1 according to a fourth embodiment of the present invention.

FIG. 5 shows the state where the brush seal 2 is bent by an annular projection 9 under the pressure of the sealed fluid. The annular projection 9 is formed approximately in the center of the recess 8 in the brush seal device 1 of FIG. 2.

With the structure of FIG. 5, when the pressure of the sealed fluid is applied from the high-pressure (P1) side, the radial length of the bristles 4 of the brush seal 2 is reduced more than that of FIG. 2 by the bending amount by the projection 9.

Figure 6:
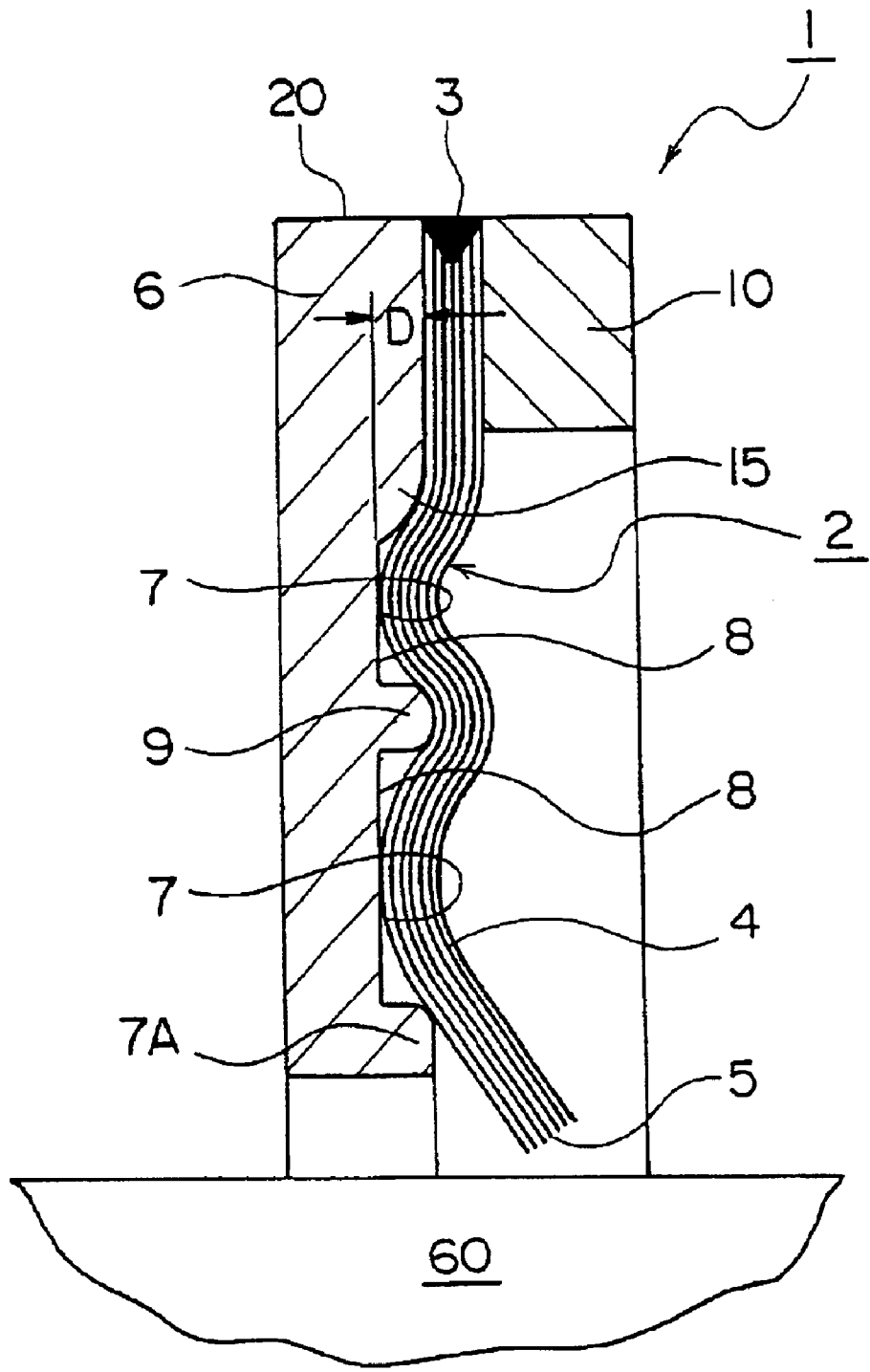
FIG. 6 is a cross-sectional view of a brush seal device according to a fifth embodiment of the present invention.

FIG. 6 is a cross-sectional view of a brush seal device 1 according to a fifth embodiment of the present invention.

FIG. 6 also shows the state where the brush seal 2 is bent by an annular projection 9 under the pressure of the sealed fluid.

In FIG. 6, the annular projection 9 and the annular projection 7A in the brush seal device of FIG. 5 are replaced with those having a rounded (R-shaped) corner. Moreover, the deformation preventing portion 15 having the tilted surface in FIG. 3 is replaced with that having a rounded surface.

With such a structure, the brush seal 2 is bent twofold under the pressure of the sealed fluid. However, the brush seal 2 will not be bent excessively at any location, allowing for improved durability without causing fatigue failure.

Figure 7:
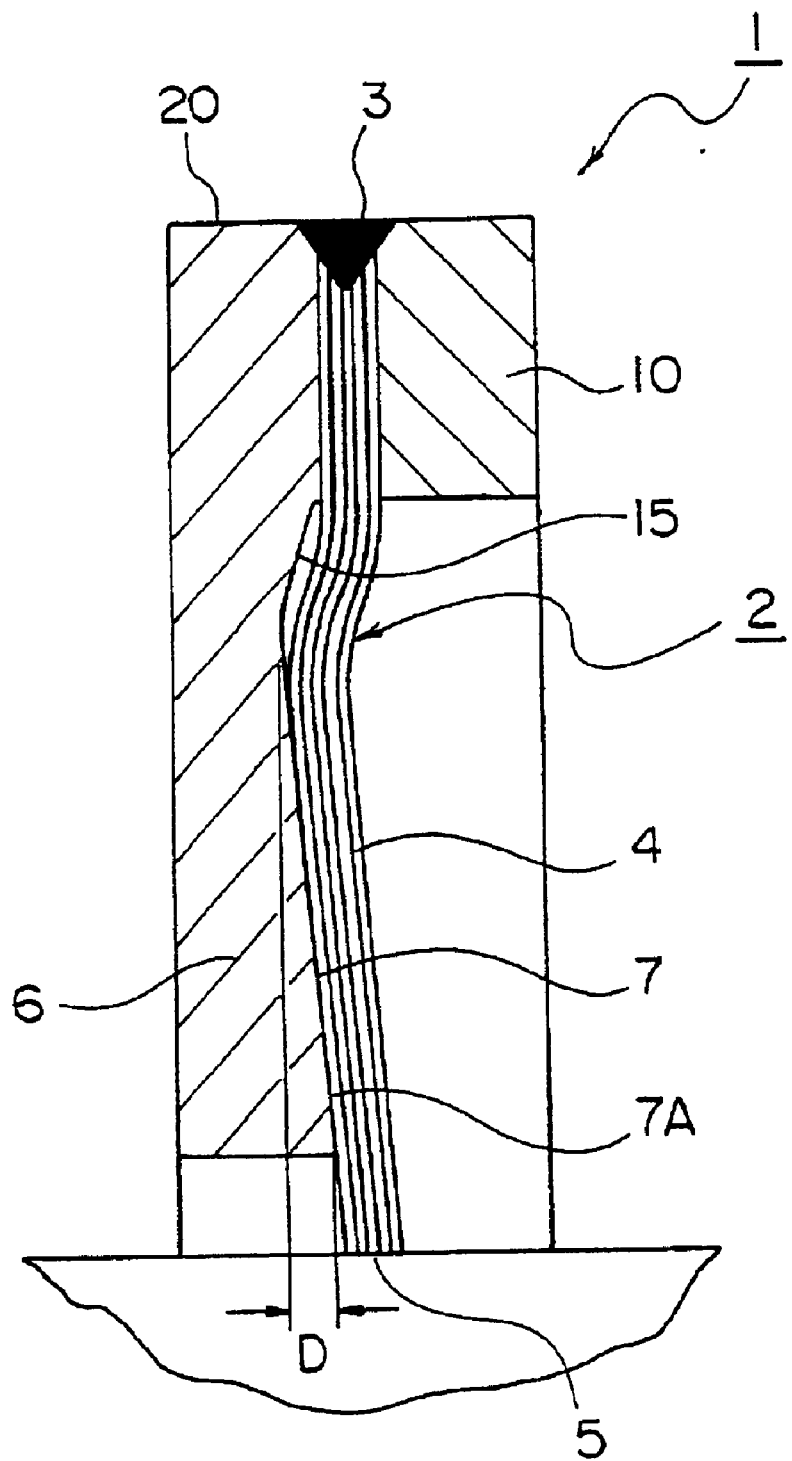
FIG. 7 is a cross-sectional view of a brush seal device according to a sixth embodiment of the present invention.

FIG. 7 is a cross-sectional view of a brush seal device 1 according to a sixth embodiment of the present invention.

FIG. 7 shows the state where the bristles 4 are bent along the support surface 7 under the pressure of the sealed fluid. In FIG. 7, the brush seal 2 is entirely supported by the support surface 7.

In FIG. 7, the support surface 7 of FIG. 1 is replaced with a tilted support surface 7, and the back plate 6 has a tilted surface at the outer periphery of the support surface 7 to form a deformation preventing portion 15. The thickness of the back plate 6 is increased toward the inner peripheral end to form a projection 7A.

The support surface 7 of FIG. 7 will not cause fatigue failure of the bristles 4 even under the pressure of the sealed fluid, allowing for improved durability.

Figure 8:
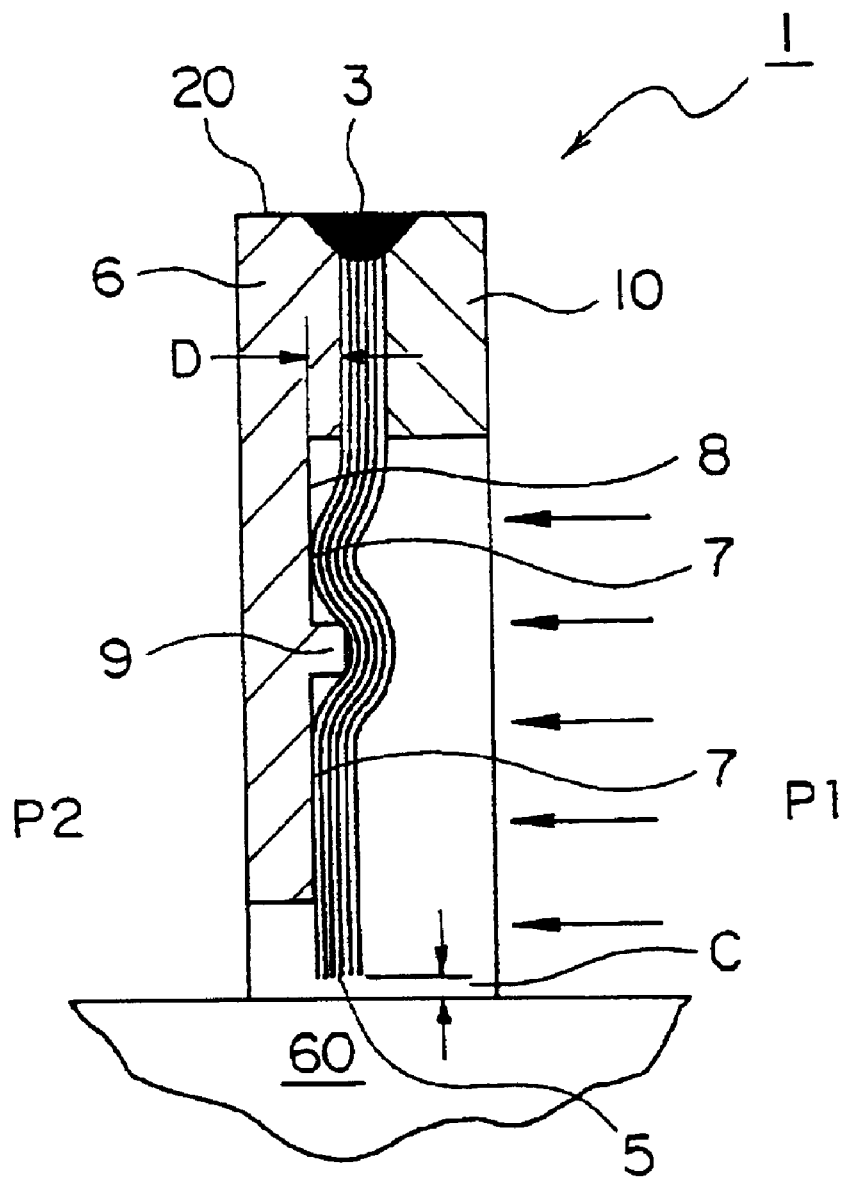
FIG. 8 is a cross-sectional view of a brush seal device according to a seventh embodiment of the present invention.

FIG. 8 is a cross-sectional view of a brush seal device 1 according to a seventh embodiment of the present invention.

FIG. 8 shows the state where the bristles 4 are bent under the pressure of the sealed fluid so that the brush seal 2 is supported by the support surface 7.

In FIG. 8, an annular projection 9 is formed at the support surface 7 of the back plate 6 in the brush seal device 1 of FIG. 1. In the brush seal device 1 of FIG. 8, the bristle 4 has a small diameter of 0.01 mm to 0.08 mm. In this case as well, the free end face 5 of the brush seal 2 is separated from the rotor 60 by the gap C in response to the pressure of the sealed fluid from the high-pressure (P1) side.

FIG. 9 is a cross-sectional view of a brush seal device 1 according to an eighth embodiment of the present invention.

The brush seal device of FIG. 9 is similar to that of FIG. 2 except that the back plate 6 and the retaining plate 10 are connected together by spot welding 14 and the attachment portion 3 of the brush seal 2 is interposed therebetween.

The back plate 6 has a recess 8. The depth of the recess 8 corresponds to the gap D between the brush seal 2 and the support surface 7. The retaining plate 10 has a greater radial width than that of FIG. 2 so as to cover the brush seal 2 toward the inner diameter. A space H is provided between the retaining portion 10 and the brush seal 2 so that the sealed fluid of the high-pressure (P1) side can act on the brush seal 2 within the space H.

Like the above brush seal devices 1 of FIG. 1 to FIG. 8, the brush seal device of FIG. 9 is also an integral, ring-shaped device.

The projection 7A of the back plate 6 has a ratchet-like, corrugated resistance means 12A at its surface. Although not shown in the figure, the corrugated resistance means 12A is formed from a series of waves tilted at the same angle as that of the bristles 4 of the brush seal 2. Each wave has a larger angle on one side and a smaller angle on the other side.

Such a resistance means 12A prevents the bristles 4 from moving in such a direction as reduces their tilt angle even under the pressure of the sealed fluid on the high-pressure (P1) side. As a result, the bristles 4 can be prevented from having an increased radial length. Moreover, the corrugated resistance means 12A is of a ratchet type. Therefore, even if the rotor 60 abuts on the free end face 5 of the bristles 4, the tilted bristles 4 move along the smaller angle of the waves of the resistance means. As a result, the tilt angle of the bristles 4 becomes larger, and thus the inner diameter of the free end face 5 can be increased.

Figure 10:
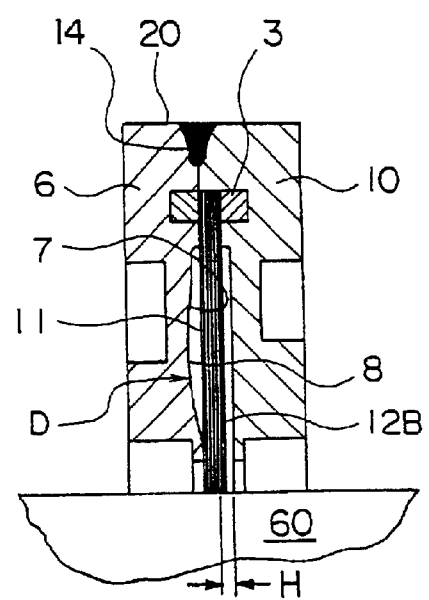
FIG. 10 is a cross-sectional view of a brush seal device according to a ninth embodiment of the present invention.

FIG. 10 is a cross-sectional view of a brush seal device 1 according to a ninth embodiment of the present invention.

The brush seal device 1 of FIG. 10 is a separated brush seal device. This is because this brush seal device has a large inner diameter, and also for the purpose of facilitating mounting onto the rotating shaft.

The brush seal device 1 of FIG. 10 has approximately the same structure as that of FIG. 9 except that the brush seal device 1 of FIG. 10 is assembled from separate parts and that the support surface 7 of the recess 8 has a circular cross section because the bristles 4 are long. Moreover, the back plate 6 has a projecting, tilted resistance means 12B at its support surface 7 facing the brush seal 2. This tilted resistance means 12B has a corrugated surface tilted so that one ends of the waves are located closer to the circumferential surface of the brush seal 2 and the other ends thereof are located away therefrom.

Like the corrugated resistance means 12A of FIG. 9, the tilted resistance means 12B regulates abnormal movement of the bristles 4. Even if the pressure of the sealed fluid is applied to the bristles 4, the tilted resistance means 12B prevents the bristles 4 of the brush seal 2 from moving particularly in such a direction as reduces their tilt angle. As a result, the inner diameter of the brush seal is not likely to be reduced.

As has been described above, when the free end face 5 of the brush seal 2 abuts on the rotor 60, the support surface 7 allows for bending of the bristles 4. This bending reduces the abutting force, thereby effectively preventing wear of the brush seal 2.

The bristles 4 are tilted in the rotation direction of the rotor 60. Accordingly, when an abnormal pressure is applied from the sealed fluid, the bristles 4 may possibly move to reduce their tilt angle, that is, the inner diameter of the brush seal 2 may possibly be reduced. In this state, the brush seal 2 will be pressed by the rotor 60. However, the resistance means 12 prevents such movement of the brush seal 2. In other words, the resistance means 12 prevents the brush seal 2 from being pressed by the rotor 60 and thus effectively prevents wear of the brush seal 2.

Figure 11:
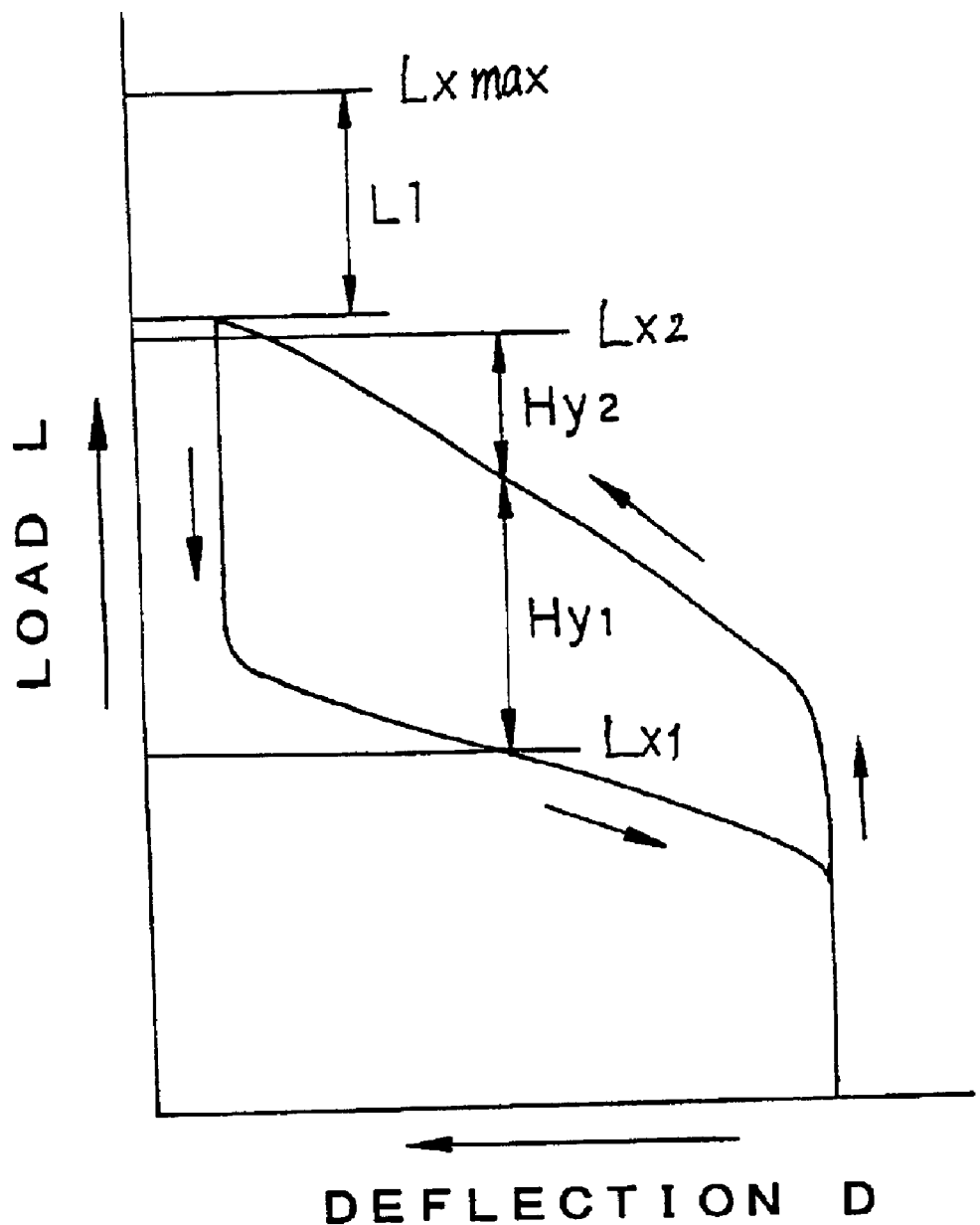
FIG. 11 is a graph showing the relation between deflection and load applied to a brush seal of the present invention in the radial direction.

FIG. 11 is a graph showing the experimental result of the relation between deflection D and load L for the brush seal device 1 of FIG. 2. In this experimentation, the bristle 4 has a diameter of 0.13 mm, the recess has a radial width W of 13 mm and a depth (gap) D of 0.5 mm, and the load is applied from the rotor 60 to the brush seal 2 in the radial direction. It can be appreciated from the comparison between FIGS. 11 and 12 that the hysteresis Hy1 of FIG. 11 is smaller than the hysteresis Hy3 of FIG. 12. In other words, at the same deflection position, the absolute load value L1 of FIG. 11 is smaller than that of FIG. 12, and the hysteresis Hy3 is reduced according to the magnitude of the hysteresis Hy2.

Figure 12:
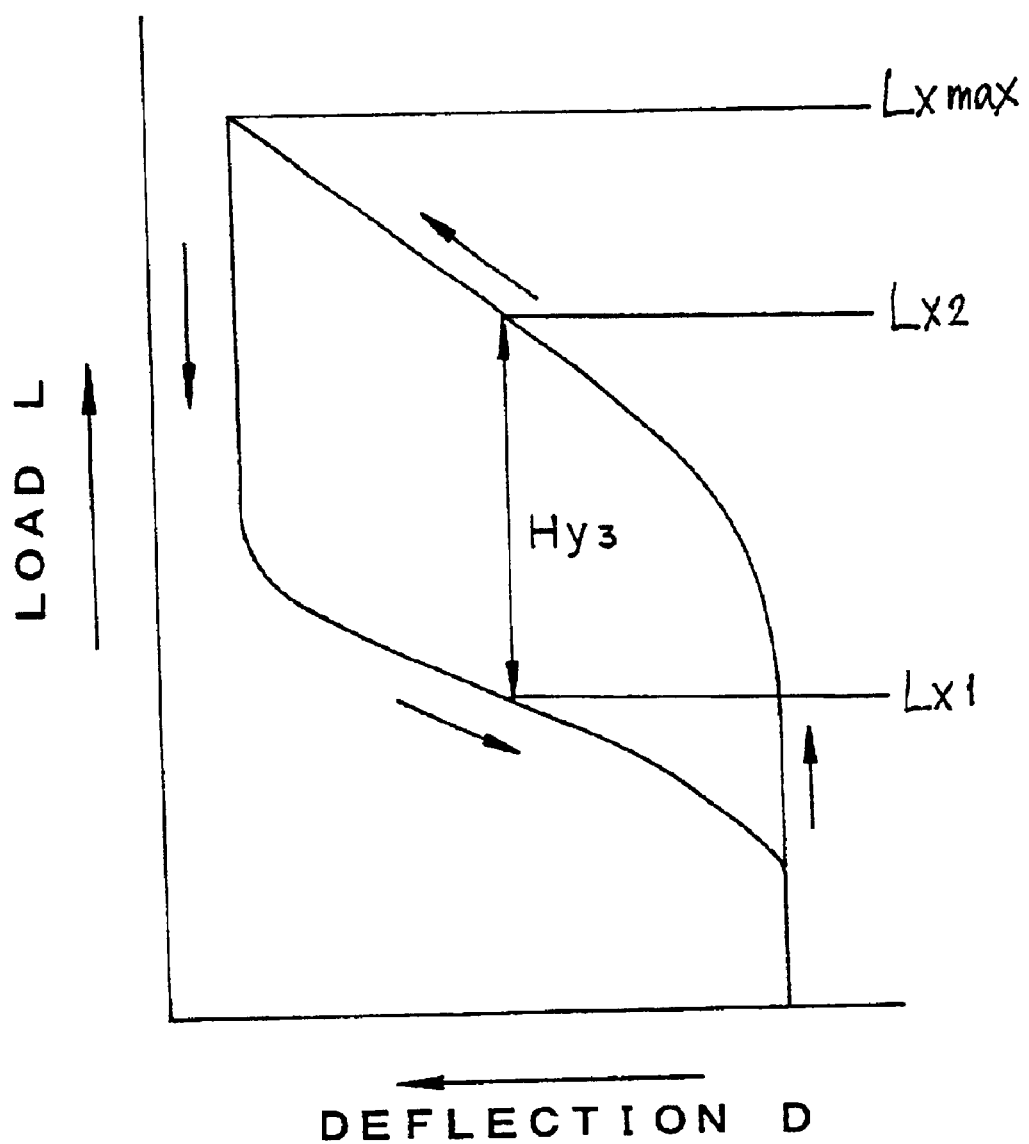
FIG. 12 shows a comparative example with respect to the relation between deflection and load of the present invention shown in FIG. 11.
Figure 13:
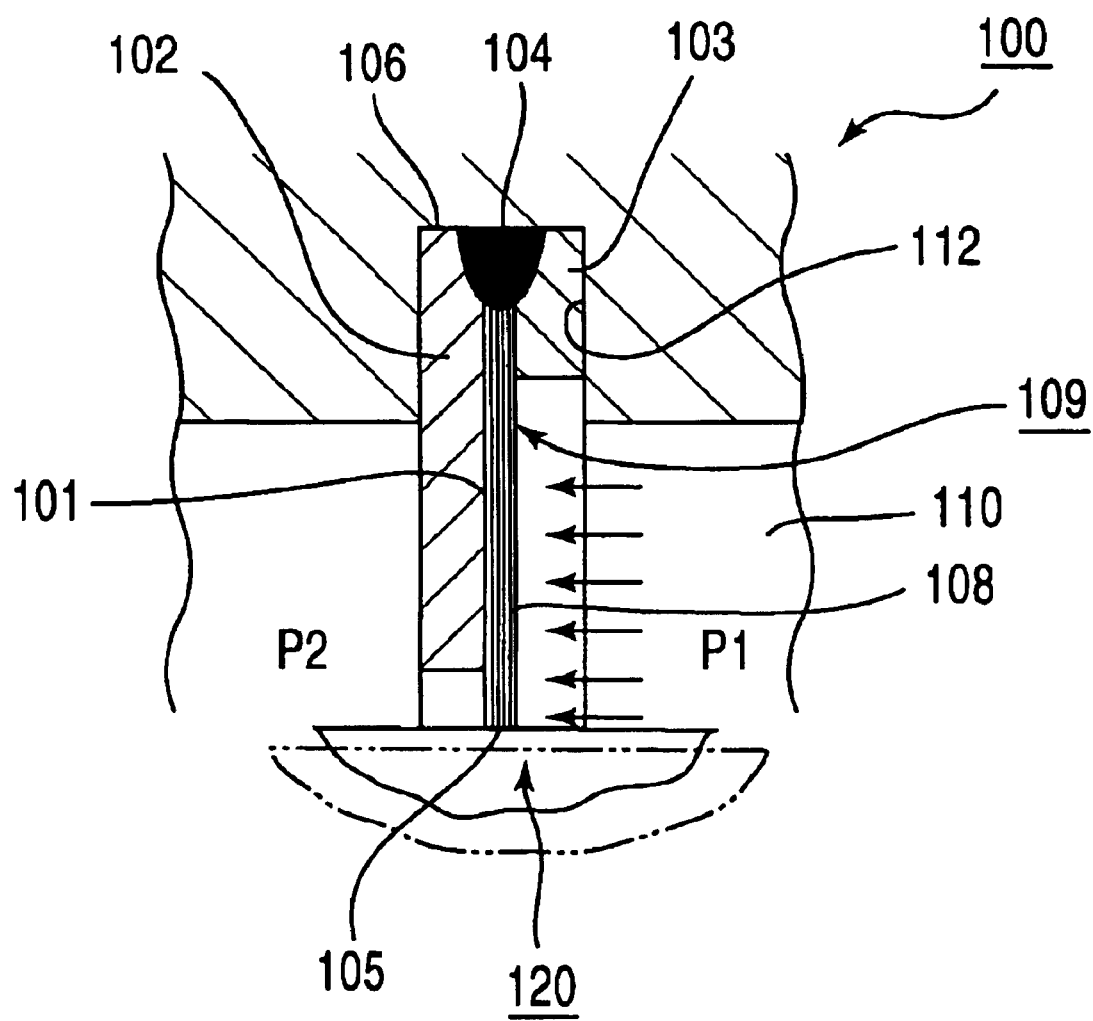
FIG. 13 is a cross-sectional view of a brush seal device mounted between a casing and a rotating shaft in the related art.
Figure 14:
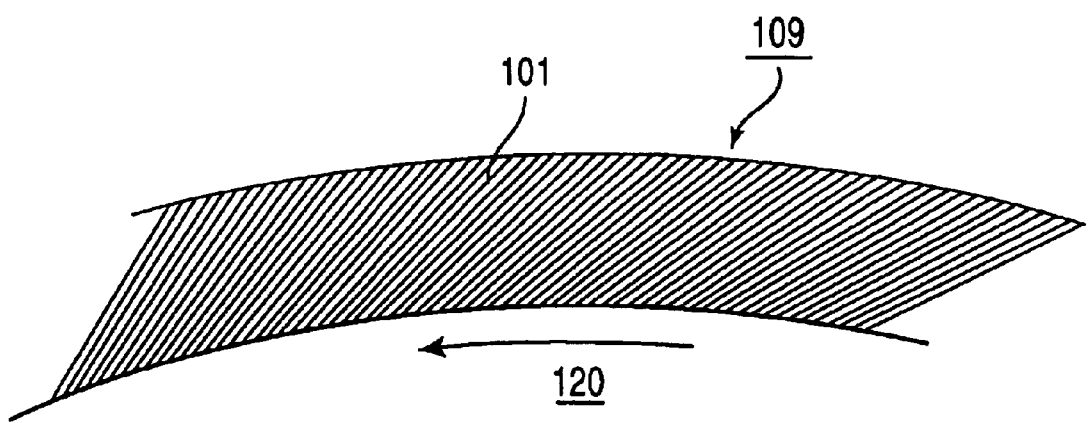
FIG. 14 is a front view of a brush seal in the state where the rotating shaft of FIG. 11 does not swing.
Figure 15:
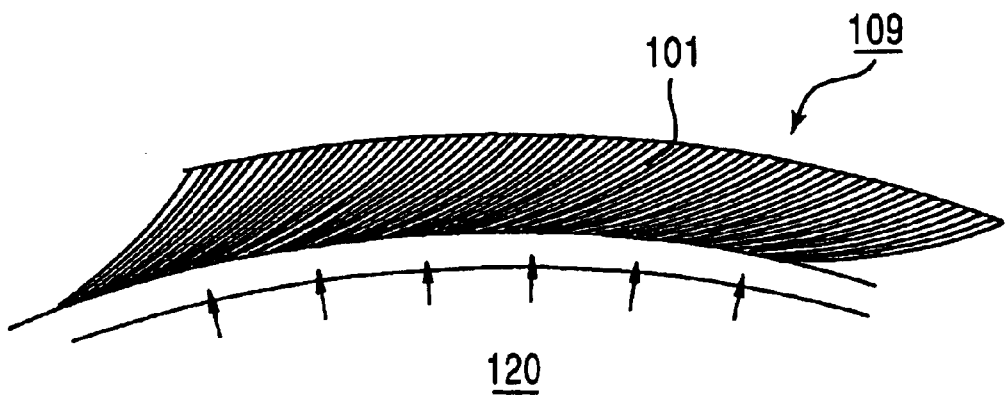
FIG. 15 is a front view of the brush seal pressed by the rotating shaft of FIG. 11.
Figure 16:
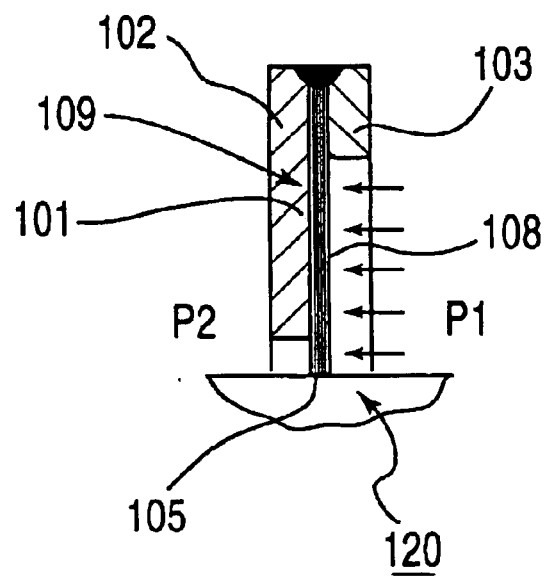
FIG. 16 is a cross-sectional view of the brush seal device of FIG. 11 being subjected to the pressure of a sealed fluid.
Figure 17:
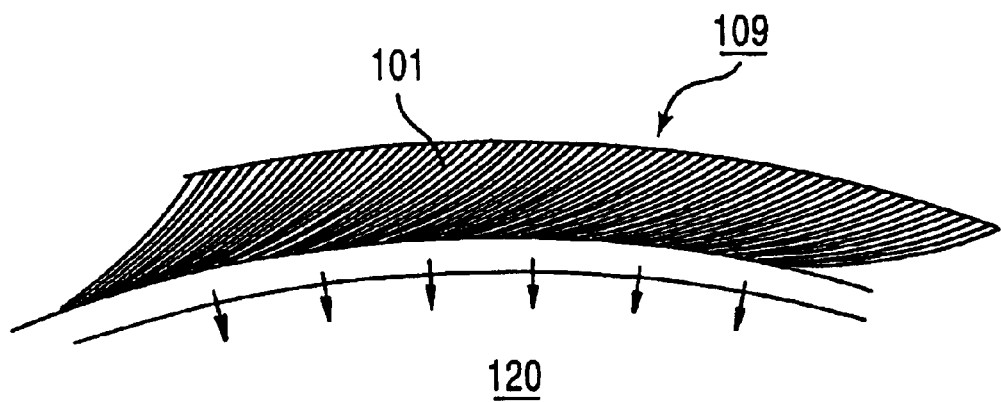
FIG. 17 is a front view of the state where the rotating shaft is moving away from the state of FIG. 13.
Figure 18:
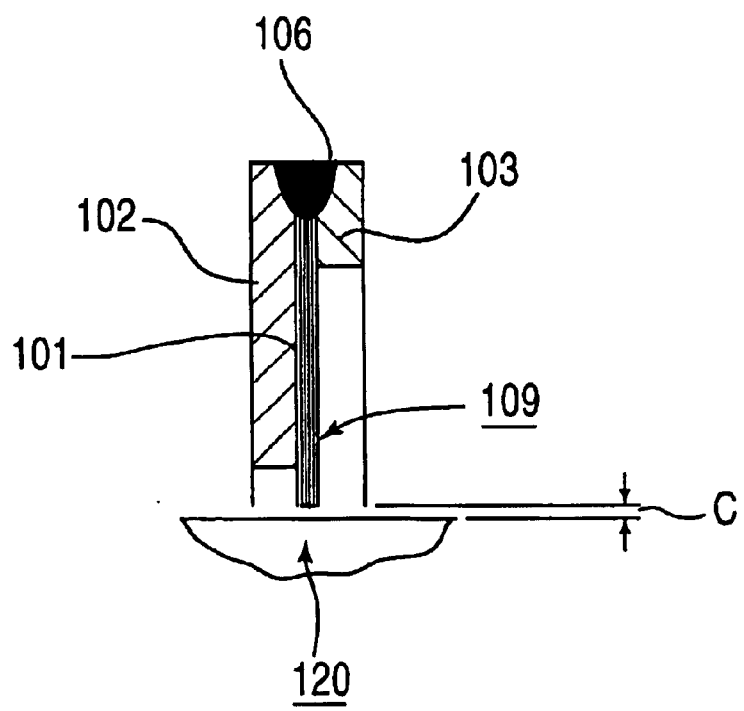
FIG. 18 is a cross-sectional view of the brush seal device in which a gap C is produced by the rotating shaft moved in the opposite direction from the state of FIG. 14.

FIG. 12 is a comparative example of FIG. 11. In this example, the brush seal device of FIG. 13 was used. The bristle 101 has a diameter of 0.25 mm. The length of the bristle 101 is the same as that of FIG. 2. Therefore, FIG. 12 is a graph showing the experimental data of the relation between deflection D and load L in the radial direction of the brush seal in the brush seal device of FIG. 13.

In this comparative example, the hysteresis Hy3 is increased in the relation between deflection D and load L. It can be appreciated from the comparison that the present invention has improved effects over the related art.

Other preferred embodiments of the present invention will now be described.

In a second preferred embodiment, the back plate has a line-shaped projection at the support surface, which extends along the arrangement direction of the bristles.

In this brush seal device, even when the rotor contacts the free end face while the brush seal is being subjected to the pressure of the sealed fluid, the bristles are bent by the projection. As a result, the radial length of the bristles is further reduced. This enables the brush seal to have a reduced contact pressure and move according to the movement of the rotor.

In a third preferred embodiment, the back plate has a recess formed along the arrangement direction of the bristles. The recess serves as the support surface.

In this brush seal device, the recess faces the back surface of the brush seal. Therefore, when the pressure of the sealed fluid is applied, the brush seal is deformed into a curved shape. As a result, the radial length of the brush seal can be reduced, thereby preventing wear of the brush seal due to contact with pressure.

In a fourth preferred embodiment, the recess has a line-shaped projection extending along the arrangement direction of the bristles.

In this brush seal device, the projection in the recess enables the brush seal to be bent in a multifold state, so that the length of the brush seal can be reduced. This results in a reduced contact pressure with the rotor, or the like.

In a fifth preferred embodiment, the bristles of the brush seal are tilted from the attachment portion, and the support surface of the back plate or the side surface of the retaining plate facing the brush seal has a resistance means for preventing the bristles from moving in such a direction as reduces their tilt angle.

In this brush seal device, the bristles of the brush seal are tilted from the attachment portion, and the resistance means provided at the support surface of the back plate or the side surface of the retaining plate facing the brush seal prevents the bristles from moving in such a direction as reduces the tilt angle of the bristles. Accordingly, the bristles are prevented from moving from the tilted state to the vertical state (i.e., raised state) under the pressure of the sealed fluid or the like. As a result, the bristles are prevented from wearing due to contact with the other part. For example, the bristles can be effectively prevented from being pressed by the rotor with an increased pressure, and thus prevented from wearing due to the contact therewith.

It is effective to provide the resistance means at the support surface close to the brush seal (e.g., the support surface of the projection, or the support surface of the projection located at the free end face of the brush seal), or at the surface of the retaining plate which is close to the brush seal and facing the brush seal).

The brush seal device of the present invention has the following advantages:

According to the brush seal device of the first preferred embodiment of the present invention, the back plate has a support surface at a distance from the opposing surface of the brush seal. Accordingly, even if the free end face of the brush seal abuts on the rotor, the bristles can be bent until they abut on the support surface. As a result, the abutting force is reduced, whereby wear of the bristles can be effectively prevented.

According to the brush seal device of the second preferred embodiment of the present invention, a projection is formed at the support surface. As a result, the length of the bristles can further be reduced by bending, whereby the abutting force with the other part is reduced. Accordingly, wear of the bristles can be effectively prevented.

According to the brush seal device of the third preferred embodiment, the back plate has a recess. Therefore, the bristles are supported at two locations, so that the radial length of the bristles can be reduced without applying excessive stresses thereto. As a result, wear of the bristles can be prevented.

According to the brush seal device of the fourth preferred embodiment of the present invention, the recess has a projection. Therefore, the radial length of the bristles is further reduced by bending, and the abutting force is reduced. As a result, wear of the bristles is prevented.

According to the brush seal device of the fifth preferred embodiment of the present invention, the radial length of the bristles can be reduced by the support surface. Moreover, the resistance means prevents the bristles from moving in such a direction as reduces their tilt angle even under the pressure of the sealed fluid, and thus prevents the radial length of the bristles from being increased. Accordingly, the bristles are prevented from being pressed by the other part, whereby wear of the bristles is effectively prevented.

The present invention has been described and illustrated in detail in terms of some preferred embodiments. However, it will be apparent to those skilled in the art that the same is by way of illustration and example only and is not to be taken by way of limitation, and that the disclosed invention may be modified or changed in numerous ways without departing from the scope of the invention. The true sprit and scope of the present invention is limited only by the terms of the appended claims.

What is claimed is:

1. A brush seal device mounted to one of two parts that move relative to each other with a gap therebetween, for sealing the gap between said parts, comprising:
    a brush seal formed from bristles arranged into a wall shape, and including an attachment portion formed by connecting said bristles together at one end, and a free end face facing an opposing surface of said other part;
    a back plate connected to said attachment portion of said brush seal, and including a support surface for supporting a side surface of said brush seal, said support surface having an annular projection extending therefrom, and said back plate further including a recess that accommodates a bended portion of said bristles resulting from a differential pressure;
    a retaining plate for retaining said attachment portion of said brush seal between said retaining plate and said back plate,
    wherein said support surface of said back plate and an opposing surface of said brush seal are disposed at a distance from each other, and said bristle of said brush seal has a diameter of 0.15 mm to 0.008 mm, and
    another annular projection extending from an inner peripheral end of said support surface.

2. A brush seal device mounted to one of two parts that move relative to each other with a gap therebetween, for sealing the gap between said parts, comprising:
    a brush seal formed from bristles arranged into a wall shape, and including an attachment portion formed by connecting said bristles together at one end, and a free end face facing an opposing surface of said other part;
    a back plate connected to said attachment portion of said brush seal, and including a support surface for supporting a side surface of said brush seal; and
    a retaining plate for retaining said attachment portion of said brush seal between said retaining plate and said back plate, wherein
        said support surface of said back plate and an opposing surface of said brush seal are disposed at a distance from each other,
        said bristle of said brush seal has a diameter of 0.15 mm to 0.008 mm,
        wherein said back plate includes a recess formed along an arrangement direction of said bristles,
        said recess serves as said support surface, wherein
            said bristles of said brush seal are tilted from said attachment portion, and
            said support surface of said back plate or a side surface of said retaining plate facing said brush seal includes a resistance means for preventing said bristles from moving in such a direction as reduces their tilt angle.

3. A brush seal device mounted to one of two parts that move relative to each other with a gap therebetween, for sealing the gap between said parts, comprising:
    a brush seal formed from bristles arranged into a wall shape, and including an attachment portion formed by connecting said bristles together at one end, and a free end face facing an opposing surface of said other part;
    a back plate connected to said attachment portion of said brush seal, and including a support surface for supporting a side surface of said brush seal, said support surface having an annular protection extending therefrom, and said back plate further including a recess that accommodates a bended portion of said bristles resulting from a differential pressure; and
    a retaining plate for retaining said attachment portion of said brush seal between said retaining plate and said back plate,
    wherein said support surface of said back plate and an opposing surface of said brush seal are disposed at a distance from each other, and said bristle of said brush seal has a diameter of 0.15 mm to 0.008 mm, and
    wherein said annular projection is disposed in a center of said support surface.

* * * * *